United States Patent [19]
Piker et al.

[11] 3,709,178
[45] Jan. 9, 1973

[54] BOAT AND TRAILER
[75] Inventors: Herbert M. Piker; Otis C. Borum, both of Jacksonville, Fla.
[73] Assignee: Farenwald Enterprises, Inc., Lancaster, Pa.
[22] Filed: April 28, 1971
[21] Appl. No.: 138,151

Related U.S. Application Data

[62] Division of Ser. No. 51,855, July 2, 1970.

[52] U.S. Cl. .................. 114/56, 9/1 T, 114/66.5 R
[51] Int. Cl. .............................. B63b 1/18
[58] Field of Search....... 114/56, 65 R, 66.5 R; 9/1 R, 9/1 T, 6; 280/414 R

[56]         References Cited

UNITED STATES PATENTS

| | | | |
|---|---|---|---|
| 3,148,652 | 9/1964 | Canazzi | 114/66.5 R |
| 2,887,978 | 5/1959 | Tritt | 114/66.5 R |
| 3,363,598 | 1/1968 | Mortrude | 114/66.5 R |
| 3,227,122 | 1/1966 | Noe | 114/66.5 R |
| 3,117,544 | 1/1964 | Schoell | 114/56 |
| 3,450,085 | 6/1969 | Van Patten | 114/66.5 |

FOREIGN PATENTS OR APPLICATIONS 1,342,972  10/1963  France..........................280/414 R Primary Examiner—Trygve M. Blix
Attorney—Holman & Stern

[57]         ABSTRACT

The boat as herein disclosed is primarily intended to be utilized with a trailer designed, particularly, to receive cooperating means on the boat hull whereby the trailer and boat, particularly, the boat hull, become a unit in using same as a movable house or home, and as a houseboat when separated from the trailer and on the water, such as a lake, river, or other body of water. Specifically, the cooperation of the trailer and house or home is accomplished by cooperating means on the trailer, that is, the longitudinal members or rails on which the boat is carried and grooves or slots formed in the hull of the boat in which the said longitudinal trailer members or rails project for thereby stabilizing both the boat when in the water and the mobile house or home when on land. The said houseboat or home is provided with a set of retractable steps for use in the water and on the land for boarding or dismounting from the same.

4 Claims, 7 Drawing Figures

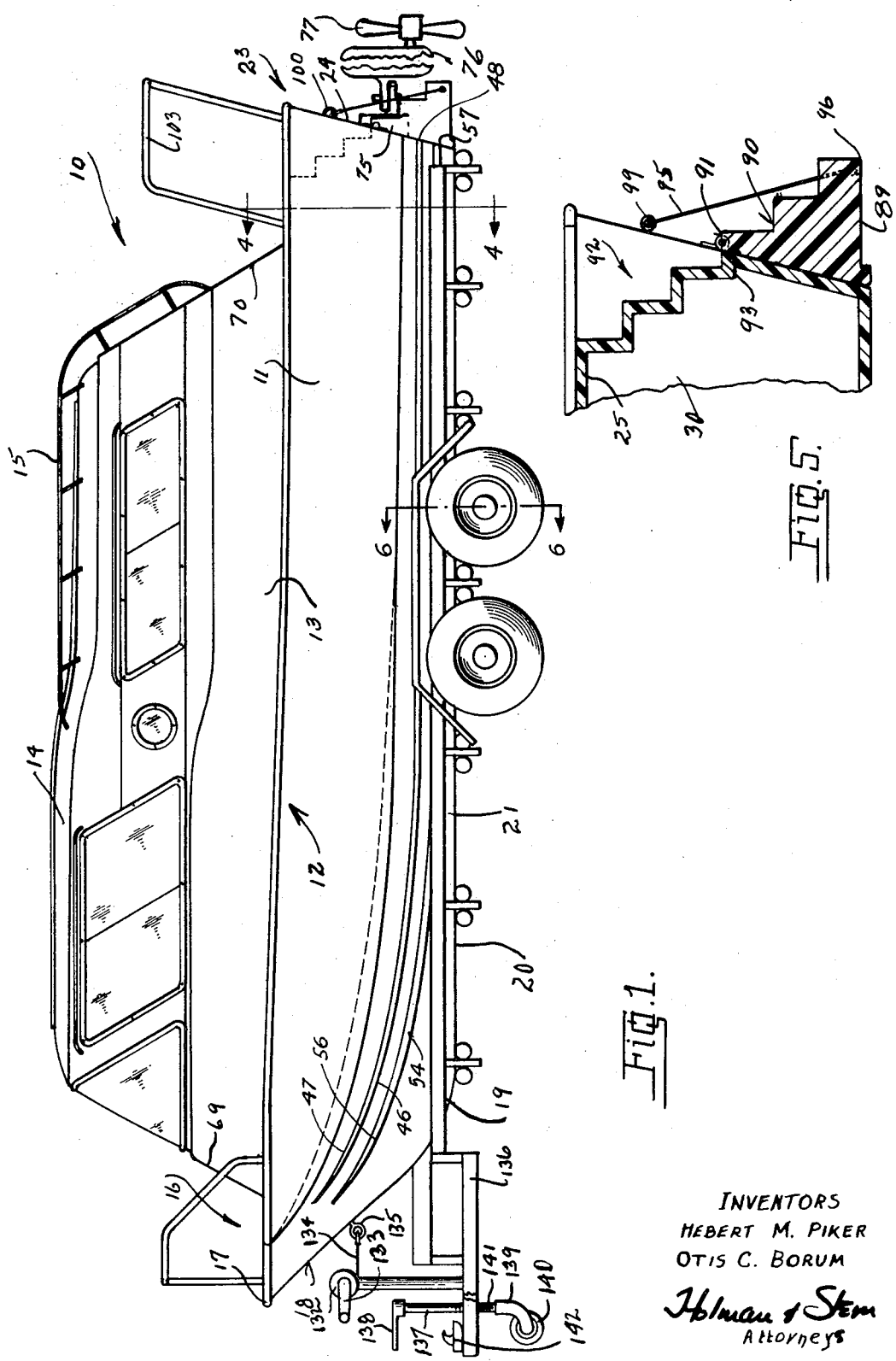

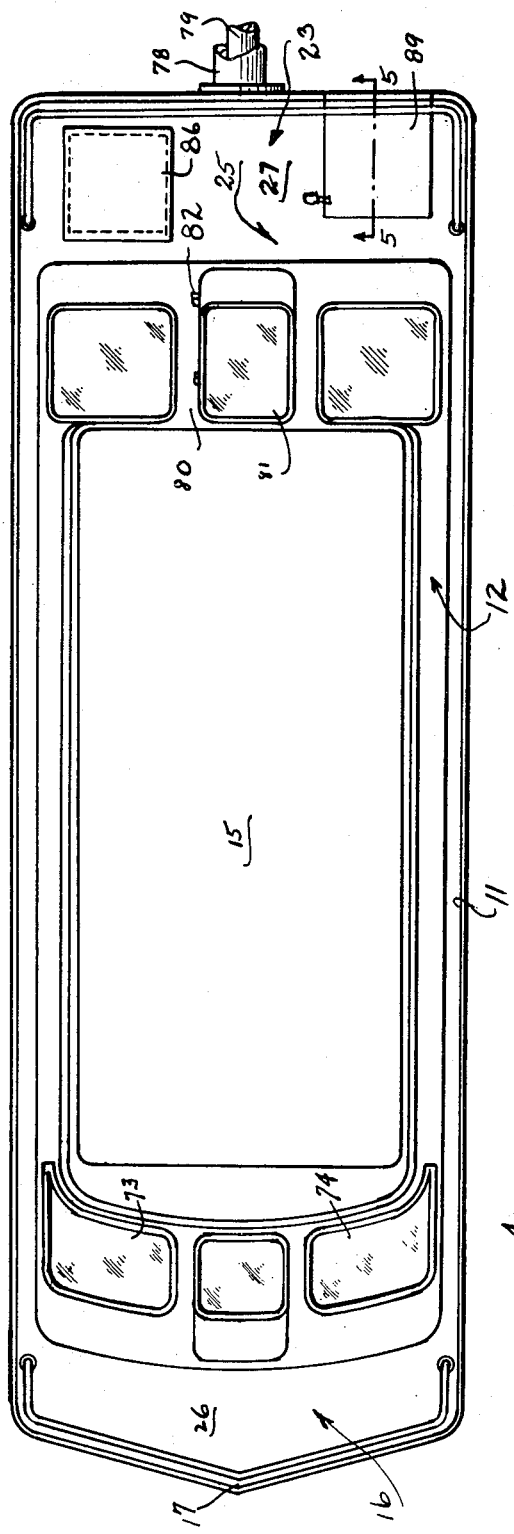
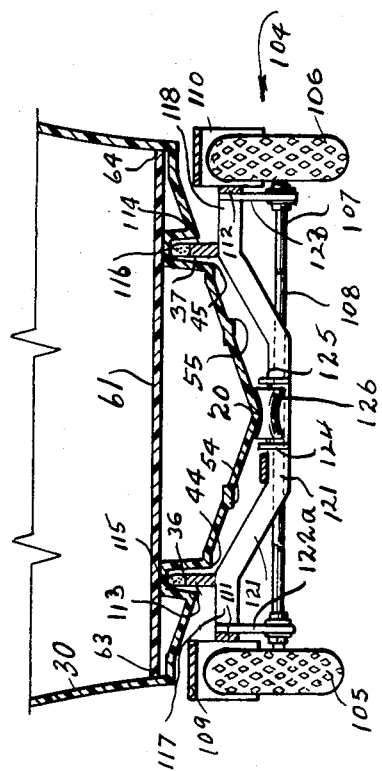
INVENTORS
HERBERT M. PIKER
OTIS C. BORUM

PATENTED JAN 9 1973 3,709,178

INVENTORS
HERBERT M PIKER
OTIS C. BORUM

Holman & Stern
Attorneys

INVENTORS
HERBERT M. PIKER
OTIS C. BORUM 3,709,178

BOAT AND TRAILER

BACKGROUND OF THE INVENTION

This application is a division of our co-pending U.S. Pat. application Ser. No. 51,855 filed on July 2, 1970, and titled "Boat and Trailer."

SUMMARY OF THE INVENTION

The houseboat and the trailer of the present invention are so adapted with respect to one another that they are provided with interengaging means for centralizing the boat while being pulled onto the trailer and at the same time provide the boat with means for effecting its stability on rough water in a lake, stream, or other body of water.

Another object of this invention is the provision in a boat, as hereinabove set forth, that has the effect of not only a cast hull but one also built that when on water the boat is sufficiently low in the water that there is no possibility, under normal circumstances, of the boat upsetting, and at the same time is provided with means on the exterior of its hull for stabilizing same while moving in the direction of travel.

Another object of this invention is the provision of integral steps, which can be raised and lowered with respect to the boat deck, cooperating with a set of hinged steps, in operative and inoperative position, and whereby the said steps when in the lower or operative position can be utilized for boarding the boat from the water as well as for boarding the boat when used as a movable home or house-trailer.

A still further object of the present invention is the provision of a cast boat, of a material such as glass fiber, so designed to include hollow members along each edge of the boat hull which retain the boat in operative position on the water and further stabilize the same while in use.

Other objects and advantages of the present invention should be readily apparent by reference to the following specification considered in conjunction with the accompanying drawings forming a part thereof and it is to be understood that any modifications may be made in the exact structural details there shown and described without departing from or exceeding the spirit of the invention.

In the drawings:

FIG. 1 is a side elevational view of a houseboat and trailer mounted on one another for movement along roads or streets and from which position the boat may be slid into the water for use thereon.

FIG. 2 is a top plan view of the houseboat as seen from above the same and as illustrated in FIG. 1.

FIG. 5 is a cross-sectional view of the trailer as seen from line 5—5 on FIG. 2 taken at a point lateral of that of FIG. 4.

FIG. 6 is a view through a portion of the rear or aft end of the boat as seen from line 6—6 on FIG. 1.

DETAILED DESCRIPTION OF THE INVENTION

Figure 3:
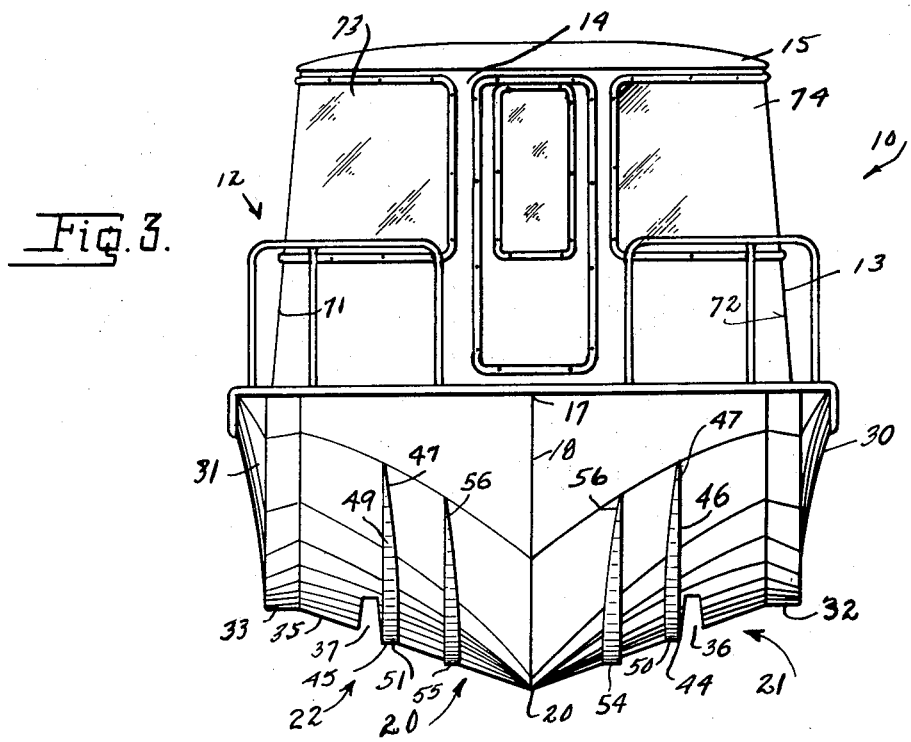
FIG. 3 is a front elevational view of the houseboat without the trailer.

Throughout the several views of the drawings similar reference characters are employed to denote the same or similar parts.

As illustrated in the drawings the houseboat, indicated in general by the reference numeral 10, comprises a hull 11 and a superstructure 12 terminating in the cabin or the like 13, in turn, having a top 14 which is provided with marginal rails 15, and the like, to prevent the falling or sliding off of people or things thereon.

As shown in FIGS. 1 and 2, the said hull comprises a front end or bow 16 terminating in a prow 17 of substantially V shape including a line from its point 18 with a decided downward and inward curve 19 whereby the boat upon being steered has at its front end a sharp or pointed prow to divide the water as it is going therethrough, all as is usual practice.

Figure 4:
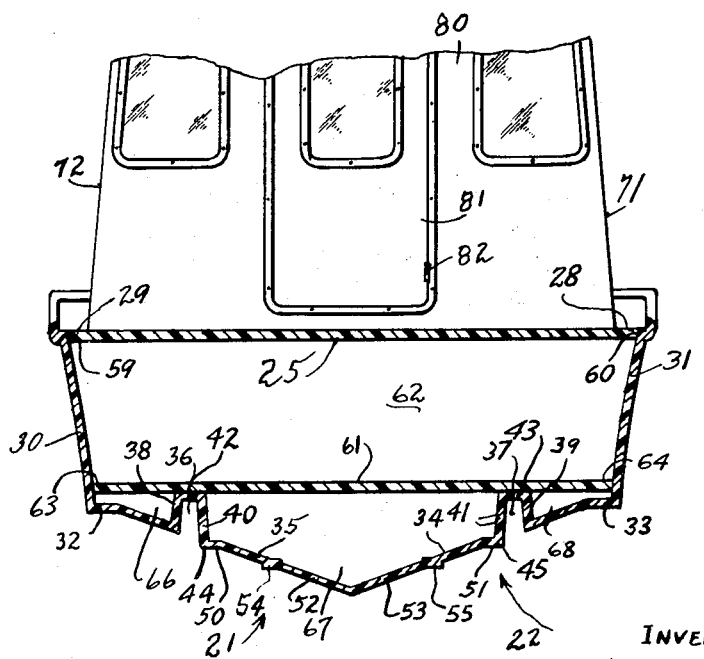
FIG. 4 is a fragmentary, vertical, sectional view through FIG. 1 as seen from line 4—4 on said FIG. 1.

The prow or sharp end 17 of the boat terminates in an elongated bottom or keel 20 on each side of which are the inclined hull bottom walls each relatively large in width and which bottom walls are indicated by the reference numerals 21 and 22, respectively, as seen in FIGS. 3 and 4, and which longitudinal pointed line or keel extends generally horizontally throughout the said length of the boat hull, see FIG. 1.

The rear or stern end 23 of the boat hull terminates in an upwardly extending, slightly inclined member or surface, as a transom, 24, whereby the boat is provided with substantially a rectangular or square aft or rear end 23, see FIGS. 1 and 2.

The superstructure 12 is as generally accepted, has the same amount of deck inwardly from the ends or boundaries, which deck, indicated in its entirety by the reference numeral 25, see FIG. 4, has front and aft deck ends, 26 and 27, as illustrated in FIG. 2, particularly, which are substantially equal in length from the prow 17 and the transom 24. The said deck 25 has substantially the same amount of exposed deck at the sides thereof, that is, the sides of the deck 25, as seen in FIGS. 2 and 4, indicated by the reference numerals 28 and 29, are of equal space from the upper ends of the substantially vertical side walls of the deck hull, and which side walls, respectively, are indicated by the reference numerals 30 and 31.

As further illustrated in FIG. 4 the said hull 11 of the boat 10 has its substantially vertical sides 30 and 31 terminating at their lower ends in longitudinal chines 32 and 33 which are generally horizontal at the stern end of the hull, see FIG. 4, and which are inwardly and upwardly inclined as they approach the bow of the hull, see FIG. 3. The inner ends of the chines project downwardly, angularly of the boat hull as portions 34 and 35 of bottom walls 21 and 22. Each of the said hull bottom portions 34 and 35 has at its inner end an upwardly projecting groove or slot extending generally parallel to, but spaced above, the keel 20 over substantially the full length of the hull, each indicated in its entirety respectively by the reference numerals 36 and 37, these grooves serving a dual purpose which will subsequently be made clear.

Each of said grooves or slots 36 and 37 is provided with a slightly, inwardly, upwardly, projecting wall 38 and 39, and a slightly, downwardly and outwardly projecting opposite wall 40 and 41 and which pairs of walls, respectively, terminate in a horizontal transverse portion or wall 42 and 43 and which horizontal portions have some width and are in reality the base, at the inner ends, of the upwardly projecting grooves or slots 36 and 37. The transverse cross-sectional shape of the grooves 36, 37 is substantially constant over their full length.

As will be noted, particularly from FIG. 4, the inner edges or corners 44 and 45, respectively, of said grooves or slots 36 and 37, particularly, the lower corner of the inner walls 40 and 41 are somewhat lower than the adjacent and continuous portions of the boat bottom or the hull bottom portions 34 and 35 and which portions or corners 44 and 45, as illustrated, particularly in FIG. 3, constitute, with respect to edge portion or corners 44, 45 ribs 46, 49 and which ribs 46, 49 as illustrated in FIGS. 1 and 3, commence practically at the forward or bow end 17 of the boat as a point 47 and which ribs 46, 49 are illustrated in FIG. 1 as terminating in the transverse edge or transom 24. The said ribs 46, 49 terminate in the rear end or transom 24 of the boat hull with said rear end being indicated in the drawings by the reference numeral 48.

Continuing the exterior bottom walls 21 and 22 of the boat hull, the said points 44 and 45, of ribs 46 and 49, are each provided with a relatively narrow flat portion 50 and 51 and which flat portions terminate in a continuation of the hull bottom inclined portions 34, 35, the continuation portions being designated 52 and 53 and which portions actually terminate in the sharp line or keel 20.

The said portions 52 and 53 of the bottom each are respectively provided, intermediate the said longitudinal sharp line or keel 20 and its relatively flat portions 50 and 51, with ribs 54 and 55 and which ribs are substantially identical to the ribs or points 46 and 49.

Again, and referring to FIGS. 1 and 3, the said ribs 54, 55 begin with a substantial point as at 56, directly beneath the points of the ribs 46, 49 and extend downwardly in a curve toward the bottom longitudinal lines 21, 22 of the sides of the hull and with said ribs 54, 55 terminating in an abrupt end 57 in the stern end or transom 24 of the boat hull 11.

Referring to FIG. 4, and as noted above, it will be further noted that just below the upper ends of the sides 30 and 31 of the hull they are connected by the deck 25 and which deck is, or may be, molded from glass fiber in the same manner as the hull and with its opposite ends 59 and 60 secured in any suitable or desirable manner to the said sides 30 and 31.

Below the deck 25 is a subdeck 61 which defines between the upper surface thereof and the under surface of the deck 25, respectively, and between the opposed inner surfaces of the hull sides 30 and 31 a space 62 which might be called the storage or engine space and at the same time it may be called the bilge water space and from which the bilge pump, not shown, discharges the accumulated water, due to seepage thereinto, back into the body of water on which the boat is at present running.

As will be noted in said FIG. 4, the subdeck 61 has its ends 63 and 64 secured to the hull sides 30 and 31 at points in the plane of the surface of the tops of the slots 36 and 37 or base side of this subdeck that the space 62 is located. Also it is through this space that the various cables and other mechanisms, electric wires and the like, extend for operating the outboard motor which, as illustrated in FIG. 1, would be attached to the said rear face of end or transom 24.

It will be noted, that with this construction and between the upper surfaces of the hull bottom portions 32-34 and 33-35 and the undersurface of the subdeck 61 there are provided air spaces or chambers 66, 67 and 68. These spaces are respectively defined by the undersurface of the subdeck 61 in opposition to the inclined portions 34 and 35 of the hull bottom as well as the members 38, 39, 40 and 41 forming the grooves 36, 37.

It is upwardly of the upper surface of the deck 25 that the superstructure 12, which includes, as well, the cabin 13, is disposed and with said cabin or superstructure including an upwardly, inwardly, inclined front 69 and an upwardly, inwardly inclined back 70 together with sides 71 and 72. As illustrated in FIG. 2, there are windows 73 and 74 at the front end of the boat cabin portion and it is behind the window 73 that the pilot of the boat sits during the operation and manipulation of the boat upon and while going through the water.

As diagrammatically illustrated in FIG. 1 there is projecting from the rear end of the boat hull 11 a bracket 75 on which is attached a motor 76 for lateral swiveling movement and said motor 76 having projecting therefrom the usual shaft on which is the propeller 77 and which propeller actually effects the movement of the boat. Also, and as diagrammatically illustrated in FIG. 2, the storage or otherwise compartment 62 has extending therethrough a pipe or the like 78 through which extend cables 79 attached to either side of the motor 75 for swinging movement to effect steering the boat. Also in the pilot's position, namely behind window 73, see FIG. 3, the main throttle arrangement is provided whereby the boat motor 76 is controlled and/or is speeded up or its R.P.M. retarded depending upon how fast it is desired that the boat move.

The cabin 13 is provided in its rear end 80 with a doorway closed by a door 81 which is hinged at 82 to one side of said doorway of the said houseboat cabin unit and through which doorway access may be had to the exterior of the boat, namely from the upper surface of the deck portion 50. It will be noted from FIG. 4 that between the cabin sides 71 and 72 and the upper ends of the hull sides, the deck sides extend to provide a deck entirely around the superstructure 12 or cabin portion 13.

The after-deck, that is, the deck portion behind the cabin and onto which the door 81 will lead, is provided with a hatch or door at 86 to the deck and whereby access may be had to the storage space portion 62 beneath the said deck.

As a matter of fact, and as illustrated in FIG. 1, the said rear deck is provided with a pair of openings one of which is the opening to the storage space portion below the deck and which opening is closed by a removable hatch door, 86, and which hatch door is provided on all four of its edges with a ledge adapted to form projecting tongues on said door for fit into the opening created to permit access to the space therebelow.

Adjacent to the hatch door 86 is a seemingly second hatch door and which in effect is a foldable stairway folded to closed position and which stairway is illustrated in FIG. 5 as open, so that the swimmers may board the boat from the water without attaching a separable ladder and at the same time without attaching a ladder to get to the movable house when it is used as a trailer house. Accordingly, as seen in FIG. 5, the said cover, is the surface 89, which constitutes a surface which will in the final analysis, and as shown in FIG. 2, be a part of the deck.

The said bottom surface 89 has extending upwardly therefrom a series of steps 90 when in its lowered or usable position.

The said movable steps terminate substantially in a half step 91 halfway up the said complete stairway whereupon the stationary or built-in stairs, indicated in general by the reference numeral 92, has its lowermost or half step 93 usable surface contiguous with the aforementioned half step 91. The said stationary steps 92 extend from the aft deck and, as mentioned above, are usable for both permitting swimmers from around the boat to climb aboard as well as when the boat is on its trailer, as illustrated in FIG. 1, for example, the said steps are then utilizable to walk up onto the deck.

The movable steps 90, are held in operative position by gravity and at the same time they are provided on each side with a connecting member or cable 95 which extends from the lower end of the movable steps 90 by extending through an eyelet or the like 96, at said lower end of said movable step and which cables are, respectively, at their opposite ends secured to eyes 99 and 100 projecting from the rear or aft end, transom 24, of the boat.

There is provided also a second cable or rope (not shown) having its one end secured to the said eyelet or the like 96 of the steps and its other end connected to a banister or railing 103 and through which the said movable steps are lifted from operative position as illustrated in FIGS. 1 and 5 to their inoperative position and thereby completing the after-deck as clearly shown in FIG. 2.

Figure 7:
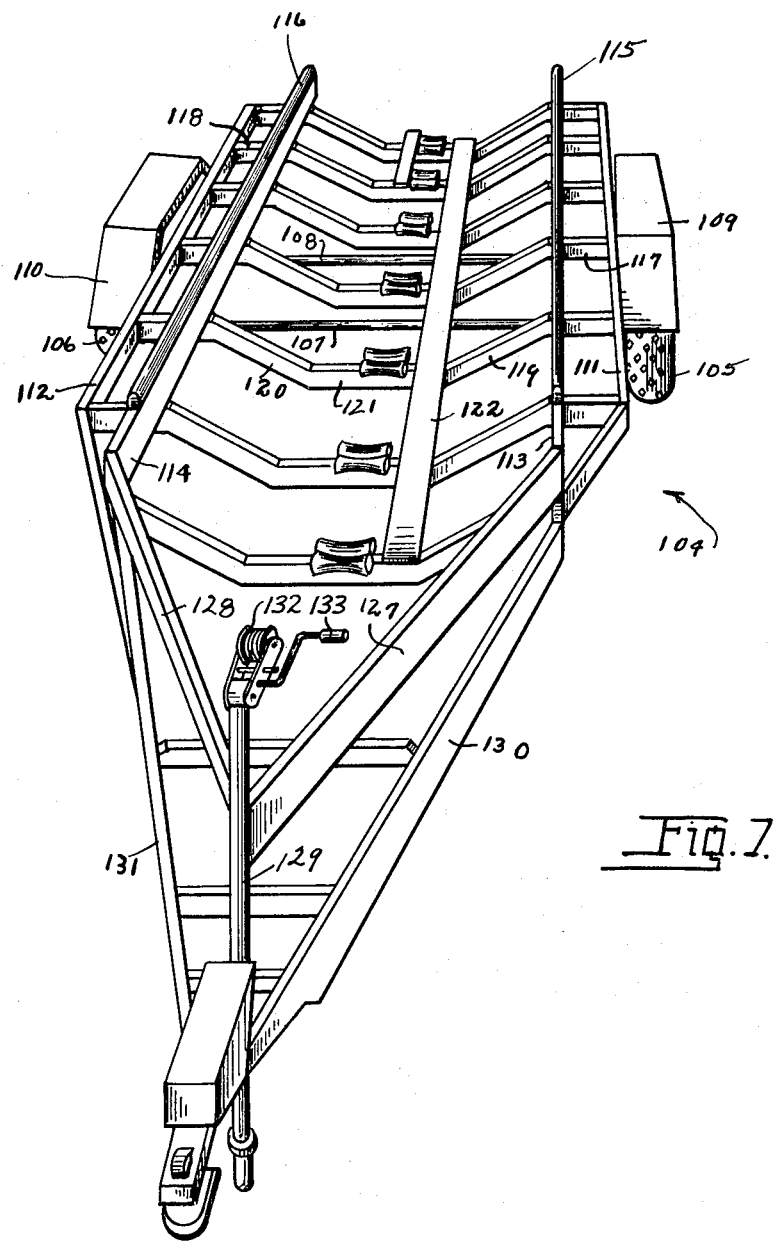
FIG. 7 is a perspective view of a trailer which is specifically arranged and designed to accommodate and cooperate with the houseboat hull.

The trailer, indicated in its entirety by the reference numeral 104, is shown in perspective in FIG. 7, and provides two pairs of rubber-tired wheels 105 and 106, one pair on each side of the trailer. The said wheels are, respectively, connected to one another through axles 107 and 108 and which wheels are further encased at their upper ends by a mudguard, respectively, 109 and 110.

The trailer, as a whole, is somewhat similar in construction with other trailers and in the main comprises a pair of longitudinal outer or main frame members or rails 111 and 112 together with a pair of inset rails 113 and 114 and which latter rails are supplied at their upper ends with continuous soft cushioning members 115 and 116. The said inset rails 113 and 114 are each connected with its respective main rail 111 and 112 by means, respectively, of relatively short connecting horizontal members 117 and 118.

The said relatively short connecting members 117 and 118 may have integral therewith, respectively, and extending toward one another, inclined cross members 119 and 120 and which members are in turn connected with comparatively horizontal cross members 121. By this construction the cross members are respectively formed of short members 117 and 118, inclined members 119 and 120 and horizontal members 121 and which latter members are on a plane well below the plane of the short members 117 and 118 and connected with cross members 121.

In order to further strengthen the cross members in operative position, use is made of a longitudinal member 122 which extends from the first horizontal cross member 121 to each of the other cross members 121 as illustrated in FIG. 7. The said outer rails 111 and 112 have depending therefrom brackets 122 and 123 each having a bearing at its lower end for the shafts or axles 107 and 108.

At a point above, see FIG. 6, the central portions or horizontal portions 121 of each cross member are provided with a pair of brackets or supports 124 and 125 supporting a roller 126 and which rollers are dish or cone shaped toward the center, so that the longitudinal sharp edge or bottom keel 20 of the boat will be properly laterally positioned by its rolling movement on such rollers as the boat is being slid into position on the trailer, as will presently be made clear.

Extending forwardly from the upper rails 113 and 114 are a pair of tongue-like members 127 and 128 which terminate in an upstanding post 129 by being welded or otherwise secured thereto. Similarly, extending from the lower rails 111 and 112 are tongue-like members 130 and 131 which again terminate in the upstanding post 129.

The said post 129 has at its upper end a reel 132 under the control of a crank 133. Wound upon the reel 132 is a pull member comprising a flexible cable or the like 134, which can be attached to the eye 135 at the forward end of the boat, see FIG. 1, and as the reel 132 is rotated by the crank 133 the flexible pull member 134 is reeled in and the boat is pulled onto the trailer.

As will be noted from FIG. 1, the said post 129 upstands from a tongue 136, and forwardly of the said post 129 there is provided a second upstanding post 137 having at its upper end a crank 138 and at its lower end a swiveling bracket 139 for a wheel 140. Intermediate the crank 138 and the bracket 139, the post 137 is provided with screw threads 141 cooperating with complementary threads within the tongue 136, whereby the bracket 130 and therefore its wheel 140 are adapted to be raised or lowered for controlling the angle of skid of the main or boat supporting beams while the boat is either being transported on the trailer or being let into or retracted from the water. Obviously, the adjustment of said wheel 140 and its bracket 139 may be effected through rotation of the crank 138.

In order to attach the trailer 104 to the pulling vehicle it is provided at the end of its tongue 136 with a hook 142 and through which the said trailer is attached to the pulling vehicle, which generally is an automobile and which vehicle or automobile pulling attaching means is not illustrated in the drawings.

From the foregoing it will be noted that there has been provided a combined boat and trailer and whereby the boat may be used on the water without the trailer as well as on the land when on the trailer.

It will further be noted that there has been provided an ideal houseboat wherein the keel, the longitudinal center of the boat indicated in the drawings as a substantial point longitudinally of the boat, with the sides thereof relatively flat whereby the boat is quite safe in the water for both adults and children.

It will also be noted that the boat and the trailer cooperating means consists of a pair of relatively higher guiding trusses or rails, which enter cooperating grooves longitudinally of the boat and which grooves are somewhat enlarged at their receiving end as compared to their inner end or bottom and whereby relatively easy cooperation is effected between the boat and the trailer for assembly. It will therefore be understood that due to the tapering of the opposed walls of the grooves or slots, the back, if not absolutely lined up with the trailer rails will be shifted to centralize the boat slots or grooves relative to the trailer rails.

It will further be noted that the longitudinal grooves or slots throughout the length of the hull of the boat have at one edge thereof, namely, the inner edge, a projecting corner which in effect constitutes a rib the other end of which merges smoothly into the normal angularity of the boat forward end or prow, particularly, each of the sides of the prow. It will also be noted that the said boat is provided between said slots and said ribs in each of its relatively flat side surfaces a second rib which cooperates with the first rib in supplying the means for maintaining the boat in a substantially even keel while it is being driven through the water.

It is appreciated that with this construction there is provided, as noted above, an ideal family boat, one in which children as well as adults can play and feel safe while so doing whether on land or on water.

A further innovation of this invention is the provision of the permanent, or built-in, steps including a step well along with a set of steps which extend into the cast steps of the boat hull and whereby the upper surface of the boat deck is provided with a continuous surface including the deck on each side of the said stairwell.

It has been found that the grooves or slots along with the ribs provide an exceptionally well-balanced boat for maintaining it on even keel and, which may also, be attributed to the rather flat bottom extending from the keel 20 on each side thereof.

We claim:

1. A boat having a hull comprising a pair of opposed generally upright longitudinal side walls each terminating at its respective lower edge in a longitudinal chine, and a pair of inclined bottom walls extending downwardly and inwardly from said chines and intersecting each other at a longitudinal keel extending generally horizontally over substantially the full length of said hull, each of said bottom walls having on the lower exterior surface thereof a longitudinal groove defined by a pair of generally upstanding walls and a transverse wall connecting the upper ends thereof, said grooves extending generally parallel to, but spaced above, said keel over substantially the full length of said hull, said grooves being disposed intermediate said chines and said keel symmetrically to either side of said keel and extending generally upwardly to at least the level of said chines over at least the major portion of the length of said hull, the transverse cross-sectional shape of said grooves being substantially constant over their full length and the portions of said bottom walls below said grooves which intersect at said keel being substantially continuations of the portions of said bottom walls above said grooves which intersect said chines, said hull configuration serving to stabilize the boat when in use on the water.

2. A boat as defined in claim 1, further comprising a generally horizontal transverse deck member connecting said longitudinal side walls of said boat at about the level of said chines, said walls defining said grooves being associated with said deck member to divide the area below said deck member into three longitudinally extending discrete air chambers.

3. A boat as defined in claim 1, wherein the inner wall, relative to said keel, of each of said pairs of generally upstanding walls defining said grooves extends downwardly below its respective inclined bottom wall, and includes a generally horizontal surface portion intersecting with said inclined bottom wall, whereby each of said inner, generally upstanding, walls defines a right-angled corner at the side of its respective groove.

4. A boat as defined in claim 1, wherein said chines include an inwardly directed wall connecting said side walls with said inclined bottom walls, said inwardly directed walls being generally horizontal at the stern end of said hull and being inwardly and upwardly inclined as said chines approach the bow of said hull.

* * * * *